United States Patent Office 3,549,701
Patented Dec. 22, 1970

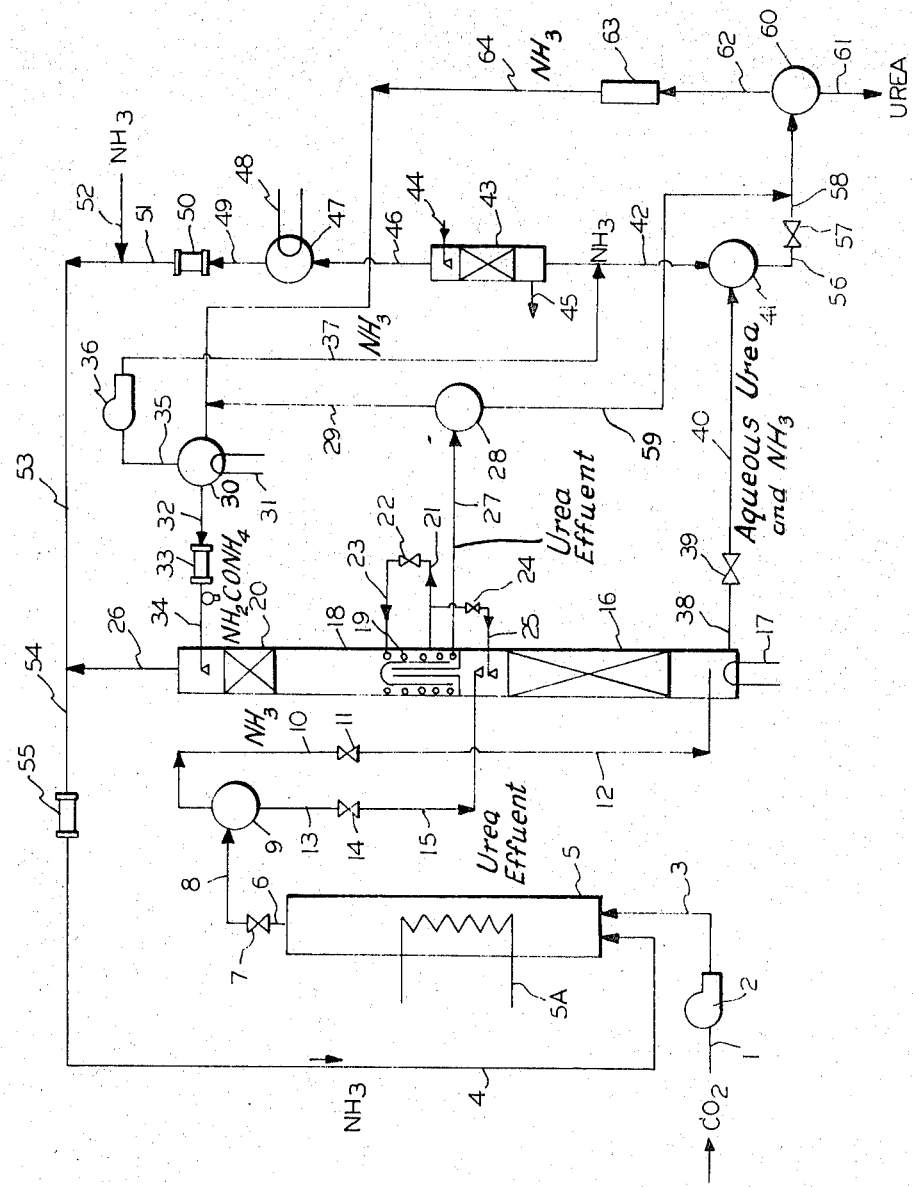

3,549,701
TWO STAGE PROCESS FOR SYNTHESIZING UREA
Eiji Otsuka, Kazumichi Kanai, and Tadao Saki, Fujisana, and Shigeru Inoue, Kamakura, Japan, assignors to Mitsui Toatsu Chemicals Incorporated, Tokyo, Japan, a corporation of Japan
Continuation-in-part of application Ser. No. 635,532, May 2, 1967. This application July 26, 1967, Ser. No. 656,633
Int. Cl. C07c 127/00
U.S. Cl. 260—555      10 Claims

ABSTRACT OF THE DISCLOSURE

Process for synthesizing urea at high conversion rates and economies wherein urea is synthesized in a first stage without solution recycle and the products and unreacted starting materials are further processed to utilize the unreacted starting materials in a second stage of urea synthesis utilizing solution recycle techniques.

This application is a continuation-in-part of a copending application, Ser. No. 635,532 filed May 2, 1967, now abandoned.

This invention relates to an improvement in urea synthesis processes of the solution recycle type and relates more particularly to urea synthesis processes of the solution recycle type wherein the synthesis of urea is carried out in two integrated steps or operations.

There is extensively used today urea synthesis processes of the solution recycle type wherein ammonia is reacted with carbon dioxide at urea synthesizing temperatures and pressures in a urea synthesis zone, the unreacted ammonia and carbon dioxide are separated from the resulting effluent (containing urea, water and unreacted ammonia and carbon dioxide) as a gaseous mixture under a pressure lower than the urea synthesizing pressure, and the thus separated gaseous mixture is absorbed in an absorbent such as water, an aqeous ammonia solution or aqueous urea solution and is circulated to the urea synthesis zone. However, in such processes, the circulation of the aqueous solution containing unreacted ammonia and carbon dioxide to the urea synthesis zone causes reductions in the conversion ratios. Furthermore, the recycled aqueous solution containing the unreacted ammonia and carbon dioxide is at a temperature so considerably lower than the urea synthesizing temperature that, in order to maintain the urea synthesizing temperature, it is necessary to preheat the liquid ammonia or the aqueous solution containing the unreacted ammonia and carbon dioxide before introduction into the urea synthesis zone.

If the urea synthesis is carried out in two steps and only ammonia and carbon dioxide are introduced into the urea synthesis in the first step, urea is produced at a high conversion ratio. For example, when the amount of excess ammonia is 150% and the reaction temperature is 190° C., in the conventional total recycle process, the conversion ratio is 65 to 68%, whereas, the aqueous solution containing the unreacted ammonia and carbon dioxide is not recirculated to the urea synthesis, the conversion ratio reaches 78%. This means that, in the latter case where the aqueous solution is not recycled, the amount of unreacted ammonia and carbon dioxide to be separated per unit weight of urea decreases to 0.52 to 0.60 times as large as in the former case. We have found it to be advantageous to carry out the urea synthesis in two steps so that urea is first synthesized without recirculating any aqueous solution containing unreacted ammonia and carbon dioxide and, in the second step, urea is synthesized from the unreacted ammonia and carbon dioxide from the first step by utilizing a solution recycle process.

An object of the present invention is to provide an improved urea synthesis process having solution recycle characteristics.

Another object of the present invention is to provide a urea synthesizing process having solution recycle characteristics wherein, however, the overall conversion ratio is high.

A further object of the present invention is to provide a urea synthesizing process utilizing solution recycle in certain phases and in which the thermal efficiently is high and the power consumption is low.

According to the present invention carbon dioxide is made to react with an amount of ammonia in excess of the stoichiometrical amount with respect to carbon dioxide under a urea synthesizing temperature and pressure in a first urea synthesis zone to form a first urea synthesis effluent containing urea, ammonium carbamate, excess ammonia and water. The first urea synthesis effluent is decompressed to a second urea synthesizing pressure which is lower than the pressure in the first urea synthesizinz zone so that the excess ammonia contained in said effluent can be separated. The urea synthesis effluent from which excess ammonia has been separated and the separated excess ammonia are then brought into contact with each other under a second urea synthesizing pressure so that the unreacted ammonium carbamate contained in the urea synthesis effluent is decomposed and discharged as a gaseous mixture of ammonia and carbon dioxide to obtain a first aqueous solution containing urea. This gaseous mixture is introduced into a second urea synthesizing zone and is kept at a urea synthesizing temperature under the second urea synthesizing pressure so that two phases, i.e., a second urea synthesis effluent and gaseous ammonia escaping out of said second urea synthesis effluent, are formed. The second urea synthesis effluent is thereafter decompressed so that the unreacted ammonia and carbon dioxide contained thereby can be separated as a gaseous mixture from said effluent to obtain a second aqueous solution containing urea. At least a part of this gaseous mixture is condensed or is absorbed in water, an aqueous ammonia solution or an aqueous urea solution and is recirculated to the second urea synthesis zone. The gaseous ammonia escaping out of the urea synthesis effluent in the second urea synthesis zone is combined with fresh liquid ammonia so as to be liquefied and is recirculated to the first urea synthesis zone. The first and second aqueous solutions containing urea are subjected to a conventional finishing step to obtain urea in the form of crystal or prill.

In the present invention, the synthesis of urea is carried out in two steps. In the first step, carbon dioxide and an amount of ammonia in excess of the stoichiometrical amount with respect to carbon dioxide are made to react with each other. The first step is carried out preferably at a mol ratio of $NH_3/CO_2$ of 4 to 6:1, a temperature of 190 to 210° C. and a gauge pressure of 200 to 350 kg./cm.$^2$. In the first step, the recovered aqueous solution of the unreacted ammonia and carbon dioxide is not reintroduced into the urea synthesis zone, thus differing from the conventional urea synthesis process of the solution recycle type, and as a result the conversion ratio is so high as to be 67 to 86% under the above-mentioned conditions.

The urea synthesis effluent from the first step is decompressed to a gauge pressure preferably of 80 to 160 kg./cm.$^2$, or more preferred 100 to 140 kg./cm.$^2$, so that excess ammonia can be separated from the effluent. By bringing the urea synthesis effluent from which the excess ammonia has been separated into contact with the separated excess ammonia in the unreacted ammonium carbamate decomposing zone, the unreacted ammonium carbamate is driven off from the effluent as a gaseous mixture of ammonia and carbon dioxide mixed with the excess ammonia. By this method, even at such high pressures as mentioned above, substantially all of the unreacted carbon dioxide is driven off from the urea synthesis effluent.

The unreacted ammonia and carbon dioxide driven off from the first urea synthesis effluent are introduced together with the excess ammonia into a second urea synthesis zone and are maintained preferably at 130 to 180° C., or more preferred at 150 to 160° C., and preferably at a gauge pressure of 80 to 160 kg./cm.$^2$, together with an ammonium carbamate solution obtained by absorbing the unreacted ammonia and carbon dioxide distilled out of the effluent from the second urea synthesis in water, an aqueous ammonia solution or an aqueous solution of urea so that a second urea synthesis is carried out and two phases of a second urea synthesis effluent as a liquid and gaseous ammonia escaping from it are formed. The excess ammonia in the second urea synthesis will be automatically maintained at 50 to 150%. The conversion ratio amounts to about 30 to 50%. Since nearly half of the ammonia and carbon dioxide is introduced as a high temperature gas into the second synthesis, heat is in excess. This heat is removed by cooling. A prferable cooling means is to withdraw the second urea synthesis effluent, decompress it and pass it through a cooling pipe provided in the second synthesis zone to utilize the excess heat in the synthesis zone for later distilling the unreacted ammonia and carbon dioxide in the second urea synthesis effluent. Needless to say, the excess heat can also be recovered as steam by any conventional method.

The unreacted ammonia and carbon dioxide separted from the second urea synthesis effluent after heating and decompression are cooled and condensed by the conventional method to produce a recovered aqueous ammonium carbamate solution and the thus formed solution is compressed and introduced into the second urea synthesis zone. In this case, it is preferable that, in order to preheat the recovered ammonium carbamate solution, a packing zone is provided in the upper part of the second urea synthesis zone so that the recovered ammoium carbamate solution may be made to flow against the rising hot ammonia gas current separated from the urea synthesis effluent in the second urea synthesis zone. Thus, the recovered ammonium carbamate solution introduced, for example, at 50° C. is preheated to 130° C. by the gaseous ammonia current. The ammonia gas current has the carbon dioxide contained by it removed by the counter-flow of the recovered ammonium carbamate solution, is taken out as pure ammonia at 100 to 140° C. under the same pressure as the second urea synthesizing pressure, is liquefied by being mixed with the newly fed liquid ammonia and is recirculated to the urea synthesis in the first step. Since the excess ammonia is thus recovered at a high pressure and temperature, the power input for the first urea synthesis zone is small and it is not necessary to preheat the liquid ammonia before it is introduced into the first urea synthesis zone. Therefore, the consumption of heat and power is reduced.

Some ammonia and a slight amount of carbon dioxide are contained in the aqueous solution of urea passing from the unreacted ammonium carbamate decomposing zone. However, these gases can be easily separated with the sensible heat of the aqueous solution of urea by decomposing said aqueous solution to a gauge pressure of 10 to 40 kg./cm.$^2$. The separated ammonia has the slight amount of carbon dioxide contained thereby removed by such proper method as washing with water, is cooled and condensed, is recovered as a liquid ammonia, is combined with the ammonia emitting from the above-mentioned second urea synthesis zone together with the newly fed raw material ammonia and is circulated to the first urea synthesis zone.

The present invention shall now be explained with reference to the accompanying drawing which is a flow diagram illustrating the process of the present invention. A current 1 of raw material carbon dioxide is compressed with a compressor 2. A current 3 of the compressed carbon dioxide is introduced into the first urea synthesis reactor 5 together with a current 4 of liquid ammonia so that the mol ratio of $NH_3/CO_2$ may be preferably 4 to 6:1. The ammonia and carbon dioxide are caused to react preferably at a temperature of 190 to 210° C. and a gauge pressure of 200 to 350 kg./cm.$^2$. Since no recovered aqueous ammonium carbamate solution is introduced into the first urea synthesis reactor 5, the conversion ratio reaches 67 to 86%. The first urea synthesis reactor 5 is provided with a cooling pipe 5A. The temperature may be adjusted by passing hot water through said pipe 5A to generate steam. A current 6 of a first urea synthesis effluent from the first urea synthesis reactor 5 is passed through a pressure reducing valve 7 so as to be decompressed to a gauge pressure of preferably 80 to 160 kg./cm.$^2$, or more preferred 100 to 140 kg./cm.$^2$. The decompressed current 8 is introduced into an excess ammonia separator 9 wherein excess ammonia is evaporated by the sensible heat of the solution. A current 10 of the separated excess ammonia is passed through a pressure regulating valve 11 so as to have its pressure regulated. A current 12 having the pressure regulated is introduced into the bottom part of an unreacted ammonium carbamate decomposing column 16. On the other hand, a current 13 of the first urea synthesis effluent from which excess ammonia has been separated is passed through a pressure regulating valve 14 so as to have its pressure regulated. A current 15 of the urea snythesis effluent having the pressure regulated is introduced into the top part of the column 16. The column 16 has a packing zone or perforated plates within it. While the first urea synthesis effluent introduced into the top part of the decomposing column 16 flows down the packing zone or perforated plates in the column, it comes into contact counter-currently with the excess ammonia introduced into the bottom part of the column and rising through the column so that the unreacted ammonium carbamate in the first effluent is decomposed and driven off. The decomposing column 16 is provided with a heater 17 in the bottom part to maintain the solution temperature in the bottom of the column preferably at 160 to 210° C., or more preferably at 190 to 200° C., by high pressure steam or any other suitable heating medium.

A gaseous mixture comprising substantially ammonia and carbon dioxide from the decomposing colum 16 is introduced into a second urea synthesis reactor 18 which may be provided integrally attached to the upper part of the decomposing column 16 as illustrated but may be independent. The lower part of the second urea synthesis reactor 18 is a solution staying part (urea synthesis zone) provided with a cooling coil 19. A packing zone 20 is provided preferably in the upper part of the solution staying part so that a recovered ammonium carbamate solution to be introduced, as described hereinafter, into the second urea synthesis reactor may come into contact in said packing zone counter-currently with ammonia containing a small amount of carbon dioxide rising from the solution staying part and so that the carbon dioxide in the ammonia may be absorbed and removed. The temperature of the second synthesis reactor 18 is kept preferably at 130 to 180° C., or more preferably at 150 to 160° C., by means of the cooling coil 19 and at a pressure of 80 to 160° kg./cm.$^2$. For this cooling, low pressure steam may be generated by passing hot water through the cooling coil 19 or a current 21 of a second urea synthesis effluent produced in the second urea synthesis reactor 18 may be passed through a pressure reducing valve 22 so as to be decompressed to a gauge pressure below 10 kg./cm.$^2$ and the decompressed current 23 may be passed through the cooling coil 19. In this case, to the extent required for heat balance, a part of the current 21 of the urea synthesis effluent may be introduced into the decomposing column 16 as a current 25 by opening a valve 24. Substantially all of the carbon dioxide and a part of the ammonia introduced into the second urea synthesis reactor 18 liquefies there, a urea synthesis reaction occurs and urea is produced. Gaseous ammonia rises from the solution staying part, is washed in the packing zone 20 with a current 34 of a recovered ammonium carbamate solution introduced into the top part of the second urea synthesis reactor 18 and is taken out of the top of the column as a current 26 of pure ammonia gas at a temperature of 100 to 140° C. The current 21 of the second urea synthesis effluent from the second urea synthesis reactor 18 is decompressed to a gauge pressure below 10 kg./cm.$^2$ by the pressure reducing valve 22. The decompressed current is heated by heat-exchange with the urea synthesis zone by passing it through the cooling coil 19. A current 27 of the decompressed, heated second urea synthesis effluent is introduced into a separator 28 wherein the contained excess ammonia and unreacted ammonium carbamate are separated as a gaseous mixture of ammonia, carbon dioxide and steam. A current 29 of the gaseous mixture separated in the separator 28 is introduced into a gas condenser 30 and is liquefied by the addition of an absorbing medium such as water, an aqueous solution of ammonia and an aqueous solution of urea and cooled by means of a cooler 31 so as to provide a recovered ammonium carbamate solution. A current 32 of the recovered solution from the gas condenser 30 is compressed by a plunger pump 33 to a pressure of 80 to 160 kg./cm.$^2$ and a current 34 of the compressed recovered ammonium carbamate solution is introduced into the top part of the second urea synthesis reactor 18. A current 35 of the ammonia gas not condensed in the gas condenser 30 is compressed to a gauge pressure of 10 to 40 kg./cm.$^2$ by a compressor 36 and a current 37 of the compressed ammonia gas is recovered as described hereinafter.

A current 38 of an aqueous solution of urea containing some ammonia and a slight amount of carbon dioxide from the bottom part of the decomposing column 16 is decompressed to a gauge pressure preferably of 10 to 40 kg./cm.$^2$ by a pressure reducing valve 39 and the resulting decompressed current 40 is introduced into an ammonia separator 41 in which the greater part of the ammonia is evaporated by the sensible heat of the solution. A current 42 of the ammonia separated in the ammonia separator 41 is combined with the above-mentioned current 37 of compressed ammonia gas and they are introduced into the packed column 43 where they are cooled and washed with a current 44 of a small amount of such absorbent as wafer, an aqueous solution of urea or an aqueous solution of ammonia so that all of the slight amount of carbon dioxide contained in the combined ammonia gas is removed together with the contained water. A part of a current 45 of the absorbate from the bottom of the packed column 43 may be recirculated to the top part of the packed column 43 as an absorbent and the rest may be introduced into the gas condenser 30. Furthermore, in order to remove the slight amount of carbon dioxide contained in the above-mentioned combined ammonia gas current, instead of washing with the above-mentioned absorbent, the ammonia gas may be separated from the carbon dioxide and water contained therein by cooling it to condense the water together with all of the carbon dioxide and a part of the ammonia, thereby forming an aqueous solution of ammonium carbamate. Moreover, a rectifying column may be used instead of the ammonia separator 41 and packed column 43 so that, by introducing the current 40 of the aqueous solution of urea into the bottom of such rectifying column and introducing liquid ammonia and, if necessary, a small amount of water or an aqueous ammonia solution through the top of the column, a pure ammonia gas containing neither carbon dioxide nor water can be taken out of the top of the column. In this case, the ammonia gas from the condenser 30 is introduced into the bottom part of the rectifying column.

A current 46 of the substantially pure ammonia gas is introduced into an ammonia condenser 47 and is cooled and condensed by a cooler 48 so as to liquefy the ammonia. Furthermore, in condensing the current 46 of ammonia gas in the ammonia condenser 47, instead of cooling by the cooler 48, the ammonia gas can be liquefied by adding to said current 46 a raw material liquid ammonia to be newly fed. A current 49 of the formed liquid ammonia is compressed by a plunger pump 50 to a gauge pressure of preferably 80 to 160 kg./cm.$^2$, or more preferably 100 to 140 kg./cm.$^2$. A current 51 of compressed liquid ammonia is combined with newly fed raw material liquid ammonia 52. A current 53 of the combined liquid ammonia is further combined with the current 26 of ammonia from the second urea synthesis reactor 18. The temperature of the thus combined current is about 100° C. and the ammonia is in liquid form. Thus, as the current 26 of the ammonia gas is liquefied by being combined with the current 53 of the liquid ammonia, it is not necessary to specifically provide an ammonia condenser. A current 54 of liquid ammonia produced by the combination of the current 26 of the ammonia gas with the current 53 of the liquid ammonia is compressed by a plunger pump 55 to the pressure of the first reactor 5. The resulting current 4 of the compressed liquid ammonia is circulated to the first urea synthesis reactor 5.

A current 56 of the aqueous solution of urea containing a small amount of ammonia from the separator 41 is decompressed to a gauge pressure below 10 kg./cm.$^2$ through a pressure reducing valve 57. The resulting decompressed current 58 is combined with a current 59 of the aqueous solution of urea (containing a slight amount of ammonia and carbon dioxide) from the separator 28 and is introduced into a low pressure decomposing column 60 in which all the contained ammonia and carbon dioxide is separated under heating. A current 61 of the aqueous solution of urea from the low pressure decomposing column 60 is concentrated and subjected to crystallization to form crystal urea. The crystal urea may be melted to form a melt which is dropped through a nozzle so as to form granular urea. Alternatively, the aqueous solution of urea is concentrated until a substantially anhydrous melt is produced and the melt is dropped through a nozzle so as to form granular urea in a conventional finishing step. A current 62 of the ammonia gas containing a small amount of carbon dioxide from the low pressure decomposing column 60 is introduced into a dehumidifying column 63, if necessary, and has moisture contained by it removed. A current 64 of the dehumidified ammonia gas is combined with the current 29 of the gaseous mixture from the separator 28 and both are introduced into the gas condenser 30.

Furthermore, as a method of recovering the unreacted ammonia and carbon dioxide from the second urea synthesis effluent from the second urea synthesis, there can be applied not only the above-described method but also any of the various recovery methods of the known urea synthesis processes utilizing solution recycle. For example, the second urea synthesis effluent can be decompressed in separate high and low pressure steps in turn, the unreacted ammonia and carbon dioxide separated under the low pressure can be absorbed into an absorbent such as water, an aqueous solution of ammonia or an aqueous solution of urea. The thus obtained first absorbate may then be compressed, the unreacted ammonia and carbon dioxide separated in the high pressure step can be absorbed in the first absorbate. The resulting second absorbate can be compressed and circulated to the second urea synthesis. In some cases, only the unreacted ammonia and carbon dioxide separated under the high pressure will be absorbed in the absorbent and circulated to the second urea synthesis. Or else, the second urea synthesis effluent can be decompressed to the same pressure as exists in the ammonia separator 41, i.e., 10 to 40 kg./cm.$^2$, the greater part of the unreacted ammonia and carbon dioxide can be separated therein by distillation and said unreacted ammonia and carbon dioxide can be absorbed in the absorbate under said pressure and circulated to the second urea synthesis. The effluent containing the remaining unreacted ammonia and carbon dioxide can be decompressed to a lower gauge pressure, i.e., below 10 kg./cm.$^2$, taken out of the separator 41, combined with the current 58 of the decompressed aqueous solution of urea, and distilled to separate the said remaining carbon dioxide and ammonia from the combined aqueous solution of urea. The thus separated, unreacted ammonia and carbon dioxide can be cooled and liquefied under said lower pressure or they can be absorbed in such absorbent as an aqueous solution of urea so as to form an aqueous solution of ammonia carbamate which can be used as an absorbent for the greater part of the unreacted ammonia and carbon dioxide separated under the higher pressure as described above. In this case, the ammonia not absorbed in the above-mentioned high pressure absorption is combined with the current 42 of the ammonia gas from the separator 41 or is condensed separately and circulated to the urea synthesis.

In the present invention since the urea synthesis is divided into two steps or operations so that the urea synthesis in the first step can be carried out at a high efficiency without circulating the recovered ammonium carbamate solution thereto and the unreacted ammonia and carbon dioxide from the first urea synthesis can be subjected to a second urea synthesis of the solution recycle type as the second step, the overall conversion ratio reaches 85 to 90%. Furthermore, since the driving of the unreacted ammonium carbamate as a gaseous mixture of ammonia and carbon dioxide out of the first urea synthesis effluent is carried out under the same pressure as the pressure of the second urea synthesis, said gaseous mixture can be introduced as it is into the second urea synthesis and thus the heat of condensation of said gaseous mixture in the second urea synthesis can be effectively utilized, for example, for the decomposition of the unreacted ammonium carbamate in the second urea synthesis effluent from the second urea synthesis. Moreover, since the excess ammonia is liquefied under the second urea synthesis pressure, this liquefaction can be carried out simply by the mixing of the ammonia gas with the newly fed raw material ammonia. Therefore, no ammonia condenser is required and it is not necessary to use cooling water. Since the obtained liquid ammonia is at a high temperature, it is not necessary to preheat the liquid ammonia prior to introduction into the first urea synthesis such as is required in the conventional process. Further, the power required to compress the recovered liquid ammonia to the urea synthesizing pressure in the second step may be small.

An example of the present invention is given hereinafter to illustrate but not in any way to limit the present invention. In the example, all parts are by weight unless otherwise designated.

EXAMPLE 141.6 parts of a mixture of raw material liquid ammonia and recovered liquid ammonia and 73.3 parts of raw material carbon dioxide were introduced into the first urea synthesis reactor 5 and were caused to react therein at 200° C. under a gauge pressure of about 300 kg./cm.$^2$ to form a first urea synthesis effluent consisting of 80 parts of urea, 84.8 parts of ammonia, 26.1 parts of ammonium carbamate and 24.0 parts of water. The liquid ammonia introduced was at 103° C. and thus the temperature of the first urea synthesis reactor was readily maintained at 200° C. without preheating the liquid ammonia feed. The first urea synthesis effluent was decompressed by reducing valve 7 to a gauge pressure of about 120 kg./cm.$^2$, was introduced into the excess ammonia separator 9 wherein excess ammonia was separated. The liquid effluent from separator 9 was fed into the top part of unreacted ammonium carbamate decomposing column 16 having ten perforated plates. The excess ammonia separated in separator 9 was introduced into the bottom part of the column 16, was brought into contact countercurrently with the liquid effluent flowing down said column to have the unreacted ammonium carbamate in the urea synthesis effluent decomposed and driven off and was taken out of the top of the decomposing column as a gaseous mixture of ammonia and carbon dioxide. The column 16 was provided with a heater 17 in the bottom part and was heated with high pressure steam to provide a solution temperature of 200° C. at the bottom. An aqueous solution of urea containing 88.8 parts of urea, 36.5 parts of ammonia and 34.9 parts of water was taken out of the bottom of the column.

The gaseous mixture emitting from the top of column 16 was introduced into the second urea synthesis reactor 18 provided at the upper part of column 16 and was liquefied mostly in the lower, solution staying part (urea synthesis zone) so as to form urea. The column 16 and reactor 18 were at a pressure of about 120 kg./cm.$^2$. The thus obtained second urea synthesis effluent was withdrawn and decompressed in reducing valve 22 to a gauge pressure of 2 kg./cm.$^2$ and was passed through cooling coil 19 provided in the solution staying part of the second reactor 18. Thereby, the excess heat in the second urea synthesis was utilized for the heating and later decomposition of the unreacted ammonium carbamate in the second urea synthesis effluent withdrawn through coil 19 and at the same time the temperature of the second urea synthesis was maintained at 155° C. The second urea synthesis effluent heated by heat-exchange through cooling coil 19 was introduced into the separator 28 wherein an aqueous solution of urea containing 11.2 parts of urea, 0.7 part of ammonia, 1.2 parts of ammonium carbamate and 5.1 parts of water was separated from a gaseous mixture of 27.9 parts of ammonia, 14.0 parts of carbon dioxide and 13.8 parts of steam at 130° C. Further, in order to assist in keeping the temperature of the second urea synthesis at 155° C., a part of the second urea synthesis effluent was caused to flow through valve 24 back to the top of column 16 without being passed through the cooling coil.

The ammonia gas escaping out of the urea synthesis effluent in the solution staying part of the second reactor 18 was washed with a recovered ammonium carbamate solution (to be hereinafter described) introduced to the top of the packing zone 20 of the second reactor 18 and 39 parts of a pure ammonia gas at 120° C. were withdrawn from the top part of the second reactor 18. The withdrawn ammonia gas was liquefied by mixing with 102.6 parts of liquid ammonia at 67° C. from current 53. The liquid ammonia was compressed to a gauge pressure of 300 kg./cm.$^2$ with plunger pump 55 and was recirculated to the first urea synthesis reactor 5.

The aqueous solution of urea from the bottom of the unreacted ammonium carbamate decomposing column 16 was decompressed in reducing valve 39 to a gauge pressure of 35 kg./cm.$^2$ and was introduced into ammonia separator 41 wherein an aqueous solution of urea containing 88.8 parts of urea, 9.7 parts of ammonia and 32.8 parts of water was separated from 26.8 parts of ammonia gas and 2.1 parts of water vapor. This aqueous solution of urea was decompressed in reducing valve 57 to a gauge pressure of 2 kg./cm.$^2$, was combined with the aqueous solution of urea obtained by separating the unreacted ammonium carbamate from the second urea synthesis effluent in separator 28, and both solutions were introduced into low pressure decomposing column 60 and heated to 120° C. A gaseous mixture of 10.9 parts of ammonia, 0.7 part of carbon dioxide and 10.4 parts of steam and an aqueous solution of urea containing 100 parts of urea and 27.5 parts of water were separated in the low pressure decomposing column 60.

The gaseous mixture from the low pressure decomposing column 60 was dehumidified in dehumidifier 63 and 2.5 parts of steam were removed. The dehumidified gaseous mixture was combined with the gas from separator 28 and introduced into the absorbing column or gas condenser 30 together with an aqueous solution of ammonia consisting of 7.1 parts of ammonia and 2.1 parts of water obtained from current 45 produced by cooling to 100° C. in packed column 43 the gaseous mixture separated in separator 41. The contents of gas condenser 30 were cooled to 50° C. and a recovered solution containing 19.7 parts of ammonia, 14.7 parts of carbon dioxide and 23.8 parts of water was obtained as a column bottom solution. This recovered ammonium carbamate solution was compressed with plunger pump 33 and introduced into the top part of the second urea synthesis reactor 18 as the recovered ammonium carbamate solution referred to hereinabove. On the other hand, 26.2 parts of an ammonia gas were obtained from the top part of condenser 30, were compressed by compressor 36 to a gauge pressure of 35 kg./cm.$^2$, and were combined with 19.7 parts of the ammonia gas emitting from the packed column 43. The combined ammonia gas was then introduced into the ammonia condenser 47, compressed to about 120 kg./cm.$^2$ in plunger pump 50 and liquefied by mixing with 56.7 parts of newly fed raw material liquid ammonia. Thus, 102.6 parts of liquid ammonia were obtained as current 53.

It will be noted that, in this example, column 43 is operated as a cooler and no liquid is introduced into the column as by current 44. Moreover, it is to be noted that, in this example, the ammonia gas from compressor 36 is not passed through column 43 but is combined with the gas from separator 41 after latter said gas has passed through said column.

What is claimed is:

1. An improved process for synthesizing urea from ammonia and carbon dioxide which comprises (1) reacting carbon dioxide with an amount of ammonia in excess of the stoichiometrical amount with respect to carbon dioxide under a urea synthesizing temperature and pressure in the first urea synthesis zone to form the first urea synthesis effluent containing urea, unreacted ammonia, unreacted carbon dioxide and water, (2) reducing the pressure of said first urea synthesis effluent to a second urea synthesizing pressure lower than the pressure in said first urea synthesis zone to separate the excess ammonia contained in said first synthesis effluent to form a depleted first effluent, (3) contacting said depleted first effluent at said second urea synthesizing pressure with said separated excess ammonia to drive off unreacted carbon dioxide and additional unreacted ammonia contained by said depleted first effluent to form a first gaseous mixture containing ammonia and carbon dioxide and a first aqueous solution containing urea, (4) introducing said first gaseous mixture into a second urea synthesis zone maintained at a urea synthesizing temperature under said second urea synthesizing pressure to form a liquid phase comprising a second urea synthesis effluent containing urea, unreacted ammonia, unreacted carbon dioxide and water and a gaseous phase comprising ammonia, (5) removing said second urea synthesis effluent from said second zone and reducing its pressure to drive off unreacted ammonia and unreacted carbon dioxide as a second gaseous mixture and to leave a second aqueous solution containing urea, (6) absorbing at least a part of said second gaseous mixture in an absorbent selected from the group consisting of water, an aqueous solution of ammonia and an aqueous solution of urea to form an absorbate, (7) recirculating said absorbate to said second urea synthesis zone, (8) removing said gaseous phase comprising ammonia from said second urea synthesis zone, (9) liquefying said gaseous phase and recirculating the resulting liquid ammonia to the first urea synthesis zone, and (10) recovering urea from said first and second aqueous solutions.

2. Process as claimed in claim 1 wherein prior to step (10) the pressure of said first aqueous solution is reduced to separate ammonia contained therein and the resulting ammonia-depleted aqueous solution combined with said second aqueous solution and remaining portions of unreacted ammonia and carbon dioxide are separated from the combined aqueous solution and thereafter urea is recovered from said combined aqueous solution.

3. Process as claimed in claim 2 wherein said ammonia separated from said first aqueous solution is liquefied and the resulting liquid ammonia is recirculated to said first urea synthesis zone.

4. Process as claimed in claim 2 wherein unreacted ammonia and carbon dioxide are separated from the combined aqueous solution, are dehumidified and are absorbed in an absorbent selected from the group consisting of water, an aqueous solution of ammonia and an aqueous solution of urea and the resulting absorbate is recirculated to the second urea synthesis zone.

5. Process as claimed in claim 1 wherein the second urea synthesizing pressure is about 80 to about 160 kg./cm.$^2$ (gauge) and the second urea synthesizing temperature is about 130 to about 180° C.

6. Process as claimed in claim 1 wherein the gaseous ammonia removed from the second urea synthesis zone is liquefied by combining with a fresh feed of liquid ammonia.

7. Process as claimed in claim 1 wherein the gauge pressure of said second urea synthesis effluent is reduced to less than about 10 kg./cm.$^2$ and said unreacted ammonia and carbon dioxide are driven off by utilizing as a heat source the heat of reaction generated in the second urea synthesis zone.

8. Process as claimed in claim 5 wherein the first urea synthesizing pressure is about 200 to about 350 kg./cm.$^2$ and said first urea synthesizing temperature is about 190 to about 210° C.

9. Process as claimed in claim 1 wherein the mol ratio of ammonia to carbon dioxide in said first zone is about 4:1 to about 6:1.

10. Process as claimed in claim 2 wherein the pressure of said first aqueous solution is reduced to about 10 to about 40 kg./cm.$^2$.

References Cited

UNITED STATES PATENTS 3,446,601   5/1969   Heunks et al. _____ 260—555

LEON ZITVER, Primary Examiner

M. W. GLYNN, Assistant Examiner